United States Patent
Mariman et al.

(10) Patent No.: US 8,151,718 B2
(45) Date of Patent: Apr. 10, 2012

(54) ADJUSTABLE SEED METER DRIVE COUPLING

(75) Inventors: Nathan A. Mariman, Geneseo, IL (US); Michael E. Friestad, Rock Island, IL (US); Elijan Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/469,428

(22) Filed: May 20, 2009

(65) Prior Publication Data

US 2010/0294612 A1    Nov. 25, 2010

(51) Int. Cl.
*A01C 7/00* (2006.01)
*A01C 9/00* (2006.01)
*F16H 35/18* (2006.01)
*F16H 37/00* (2006.01)

(52) U.S. Cl. ........ 111/178; 111/184; 111/193; 111/164; 111/921; 111/922; 74/10 R; 74/10.85; 74/13; 74/14; 172/105

(58) Field of Classification Search .......... 111/177–188, 111/200, 900, 158, 170, 174, 903, 921, 922, 111/149, 157, 160, 77, 164, 163, 167, 190–196; 221/211, 278; 74/13, 14, 10 R, 10.8, 10.85; 172/105
See application file for complete search history.

(56) References Cited

U.S. PATENT DOCUMENTS

| | | | |
|---|---|---|---|
| 4,352,023 A * | 9/1982 | Sachs et al. | 290/42 |
| 5,024,173 A | 6/1991 | Deckler | |
| 6,729,250 B2 * | 5/2004 | Friestad et al. | 111/177 |
| 6,745,710 B2 | 6/2004 | Friestad et al. | |
| 7,377,221 B1 | 5/2008 | Brockmeier | |
| 2005/0284350 A1 | 12/2005 | Ptacek | |

FOREIGN PATENT DOCUMENTS

EP    1388678 A1    2/2004
FR    1419150 A    11/1965

OTHER PUBLICATIONS

European Search Report received Oct. 5, 2010 (7 pages).

* cited by examiner

*Primary Examiner* — Christopher J. Novosad

(57) ABSTRACT

A seed meter for a planting machine is provided with an adjustable drive coupling between the seed meter and the planting machine main drive. The drive coupling includes a drive member connected to the planter drive and a driven member coupled to the seed meter shaft. The drive member and driven member are drivingly engagable with one another and held into the engaged position by a biasing member. The drive member and driven member are selectively movable relative to one another to a disengaged position, enabling adjustment of the seed meter relative to the drive by rotation of the meter shaft. Once released, the coupling self-engages.

8 Claims, 7 Drawing Sheets

ADJUSTABLE SEED METER DRIVE COUPLING

FIELD OF THE INVENTION

The present invention is directed to a seeding machine and in particular to a seeding machine having an adjustable drive for at least one seed meter.

BACKGROUND OF THE INVENTION

Seeding machines, such as row crop planters, include a plurality of planting units each configured to plant a row of seeds. A conventional planter has a plurality of row units that are typically equally spaced from one another. A twin row planter however, has two rows are spaced relatively close to one another, typically less than 10 inches (25.4 cm) apart and a larger spacing between on pair of twin rows and an adjacent pair of twin rows. Among the two rows of the twin row arrangement, it is necessary to synchronize the seed locations between the two rows. This is necessary to ensure that seeds in the twin rows are not a placed adjacent to one another but rather, are staggered relative to one another to optimize the space for the plant roots. Conventional planters are not concerned about the seed spacing synchronization between adjacent rows due to the large row spacing between all rows. As a result, mechanisms and methods to accomplish synchronization are needed for a twin row planter that have not been needed previously needed with conventional planters. One approach to provide the synchronization is shown in U.S. Pat. No. 7,377,221. This synchronization mechanism requires partial disassembly of the seed meter drive to adjust one seed meter relative to the other seed meter to provide the desired synchronization. Another approach to synchronization, practiced on twin row planter's available by Great Plains Manufacturing Inc., adjusts one the seed meter relative to the other by repositioning the seed meter drive sprocket relative to the drive chain. This requires removal of the chain from the sprocket and then turning of the seed meter to another position. The Chain is then placed back on the sprocket. Adjustment of the seed meter in both of these mechanisms is complex and/or messy, caused by handling of the lubricated chain. Furthermore, neither of these mechanisms are well-suited for use in a planter that utilizes a flexible rotatable drive shaft instead of a chain to drive each seed meter.

SUMMARY OF THE INVENTION

The present invention provides a seed meter with an adjustable drive coupling having a drive member operably connected to the planter drive and a driven member operably connected to the seed meter shaft. The drive member and driven member are drivingly engagable with one another and held into the engaged position by a biasing member. The drive member and driven member are selectively movable relative to one another to a disengaged position, enabling adjustment of the seed meter relative to the drive and thus adjustment of the seed meter of one row unit relative to the seed meter of the other row unit of the twin rows.

DESCRIPTION OF THE PREFERRED EMBODIMENT

Figure 1:
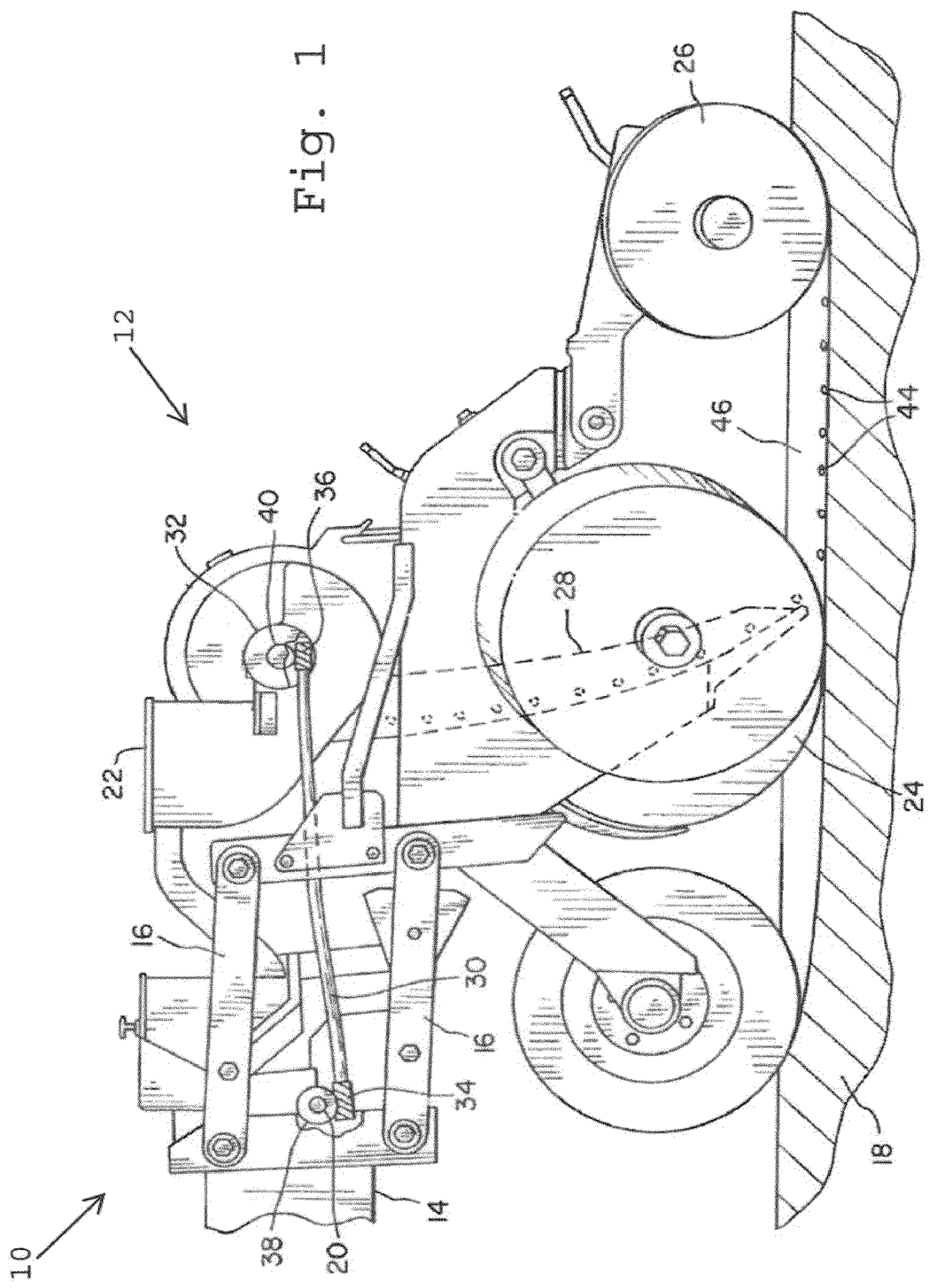
FIG. 1 is a side view of seeding machining showing a row unit having the adjustable seed meter drive of the present invention.
Figure 2:
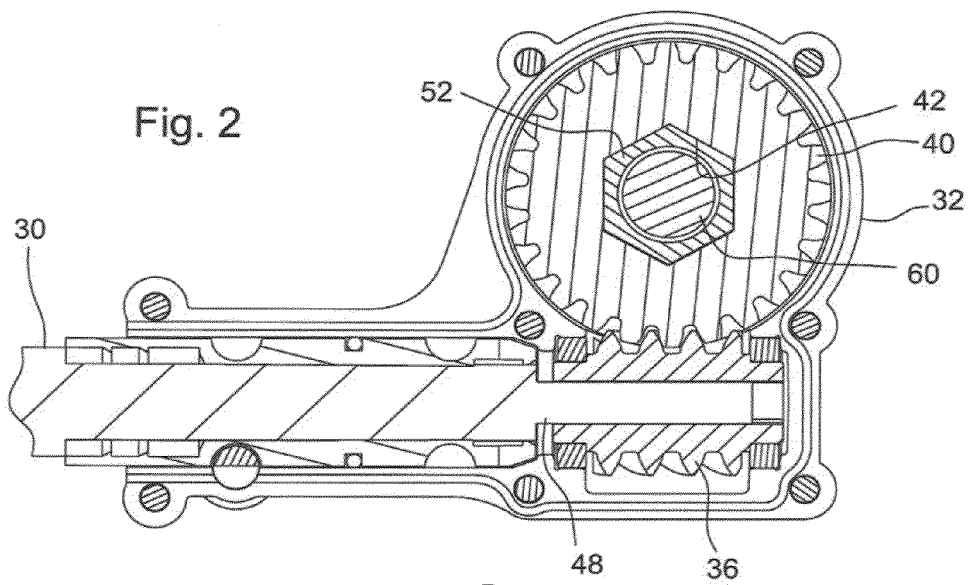
FIG. 2 is a partial sectional view of the seed meter drive transmission.

Referring now to the drawings, and more particularly to FIG. 1, there is shown an embodiment of an agricultural seeding machine 10 of the present invention. In the embodiment shown, seeding machine 10 includes a plurality of individual row units 12 coupled with a transverse tool bar or frame 14. Each row unit 12 is typically configured substantially identical to each other, and therefore only a single row unit 12 is shown and described in the drawings.

Row unit 12 is coupled with frame 14 through pivotal linkage elements 16, and thereby is movable in generally vertical up and down directions to follow the contour of soil 18. A planter drive includes a ground driven main shaft 20 that runs along the backside of frame 14 and is the source, or a primary source, of input power to each seed meter 22. Each row unit 12 also includes other components such as trench openers 24, trench closers 26, a seed tube 28, etc. which may be of conventional design and therefore not described in further detail herein.

The terms "drive" and "driven" are used herein with respect to the mechanical transfer of power between components. A flexible drive shaft 30 has an input bevel gear 34 which is driven by main shaft 20 through a corresponding mating gear 38. Shaft 30 further has an output bevel gear 36 disposed within the housing of a transmission 32. As describe below, the output of the transmission is a meter shaft of a seed meter 22 or is connected to the meter shaft. Seed meter 22 is used to space seeds 44 at an average predetermined distance from each other within seed trench 46, which in turn results in a predetermined seed population within a unit area (e.g., acre) in soil 18. Seed meter 22 generally includes a seed plate or other rotatable structure which is used to segregate and to drop seeds into seed tube 28 where they fall by gravity into seed trench 46. Regardless of the particular configuration, seed meter 22 includes a meter shaft 60 as described below.

Figure 3:
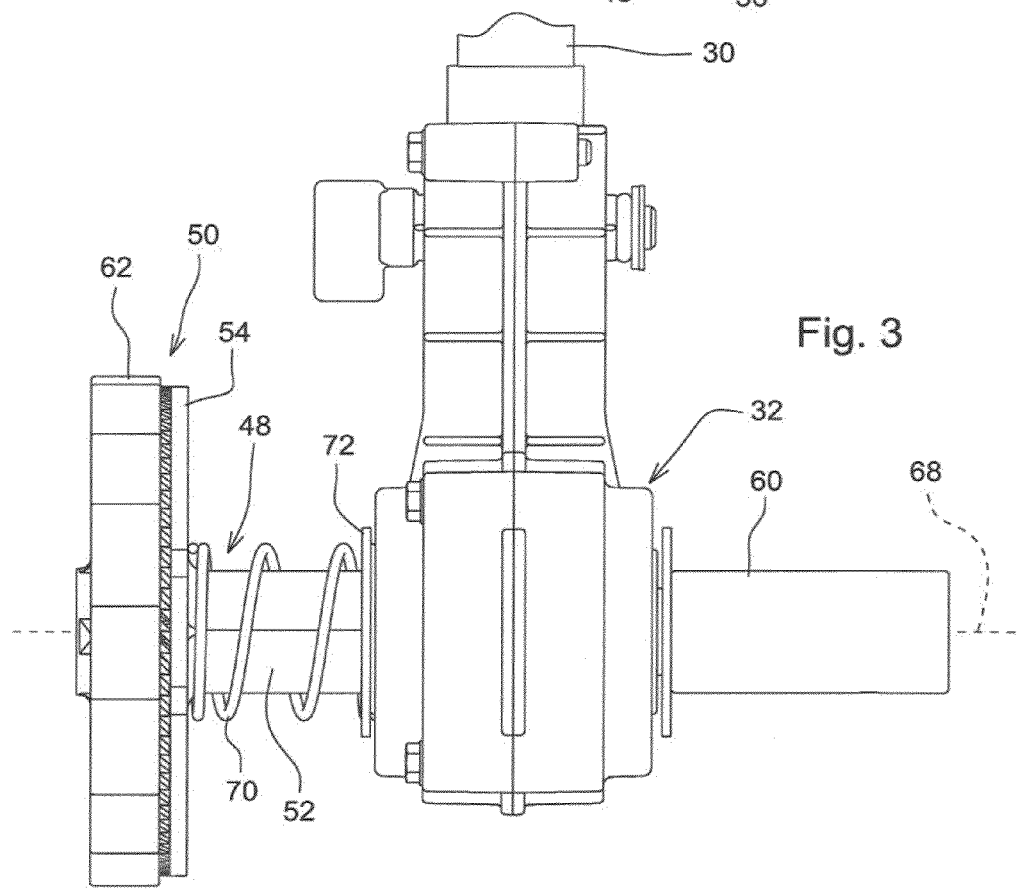
FIG. 3 is a top view of the seed meter drive transmission and adjustable coupling.
Figure 4:
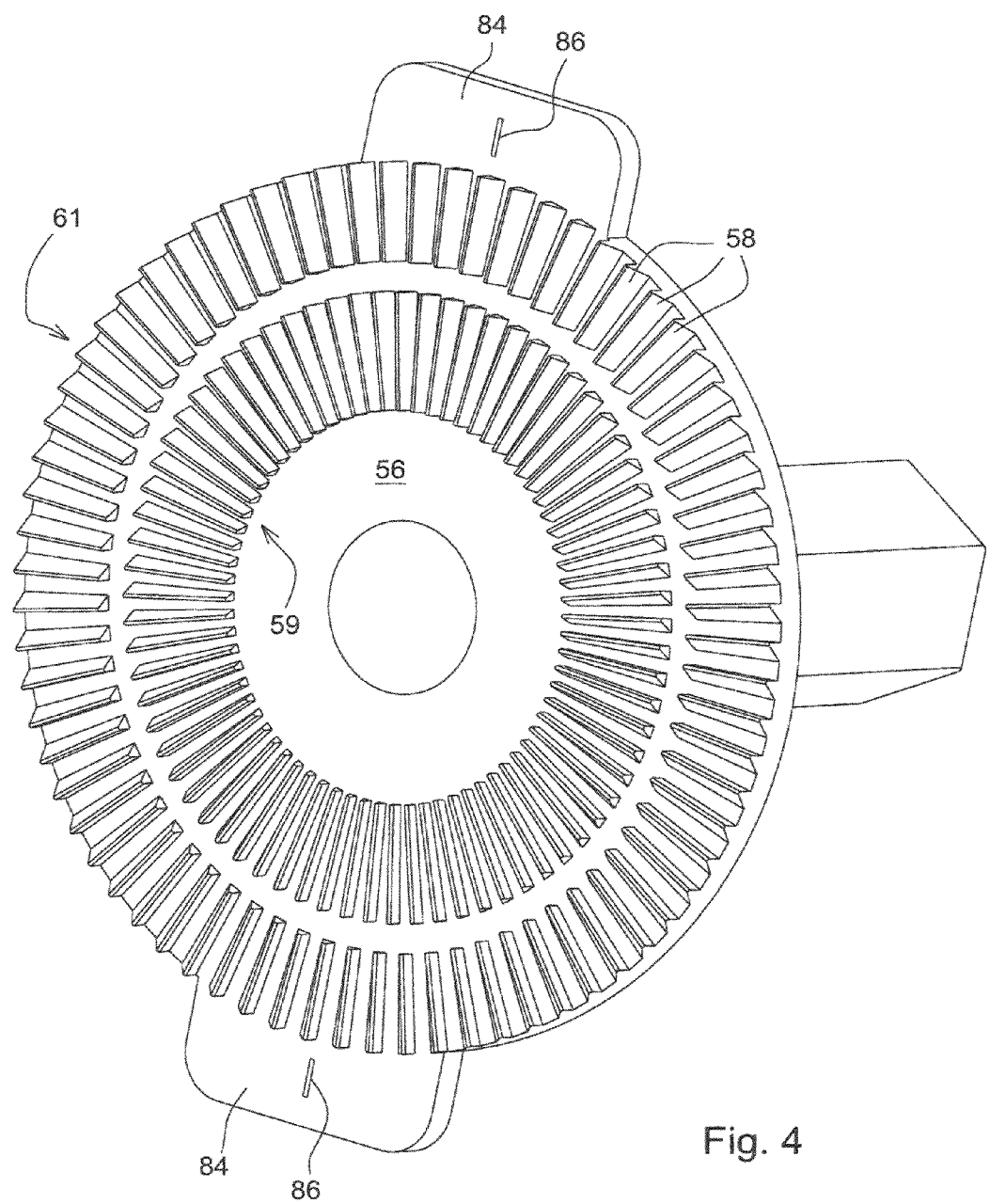
FIG. 4 is a perspective view of the coupling drive member.
Figure 5:
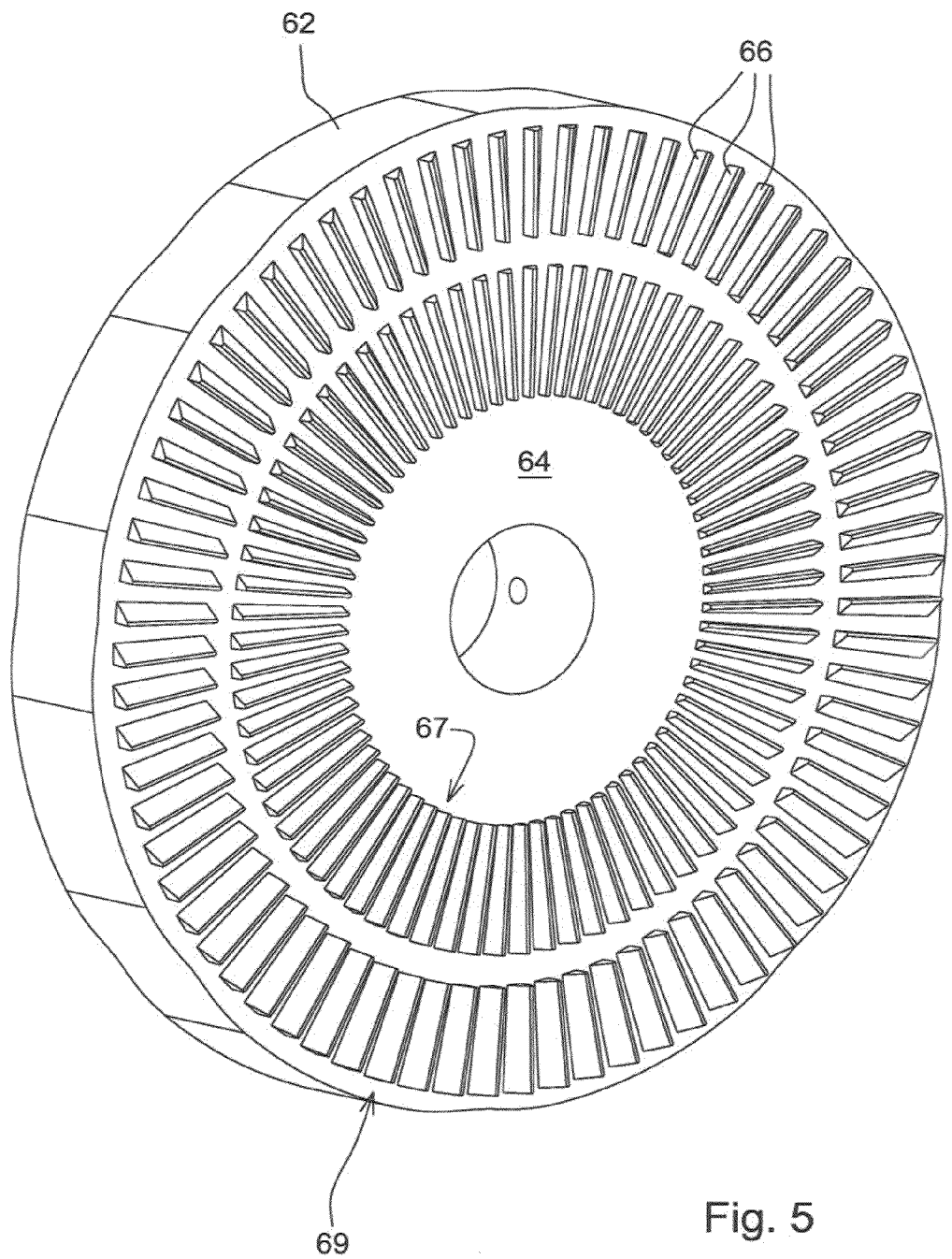
FIG. 5 is a perspective view of the coupling driven member.

Turning attention now to FIGS. 2 through 5, the output bevel gear 36 meshes with a corresponding mating gear 40. The gear 40 as an internal hex shaped bore 42. The bore 42 supports a drive member 48 of the coupling 50. The drive member 48 has a hex shaped shaft portion 52 which is received within the bore 42 of the gear 40. The drive number 48 further includes a disk portion 54 at its outer or distal end. The disk portion 54 has a side surface 56 with a plurality of raised teeth 58, see FIG. 4. The meter shaft 60 extends through the center of the drive number 48 and extends from the transmission 32 to the right as shown in FIG. 3. The shaft 60 extends through the center of the drive member 48 to the left of the transmission as viewed in FIG. 3. A driven member 62, in the form of a disk, is coupled to the end of the meter shaft 60, adjacent the disk portion 54 of the drive member. The driven member 62 likewise has a side surface 64 with a plurality of raised teeth 66, see FIG. 5. The raised teeth 58 of the drive member and the raised teeth 66 of the driven member are arranged in two annular arrays on each member, radially inner and outer arrays 59 and 61 on the drive member and radially inner and outer arrays 67 and 69 on the driven member. The teeth of the drive and driven members are complementary to and engage one another. Two arrays of teeth are provided to enable fine adjustment between the two coupling members. In the embodiment shown, the teeth in each array are spaced apart five degrees. The inner array of teeth is offset 2.5 degrees from the teeth of the outer array, thereby enabling adjustments of 2.5 degrees. This allows the individual teeth in each array to be larger than if only one array of teeth were provided with 2.5 degree spacing. The drive member 48 is slidable along the axis 68 of the meter shaft 60. A biasing member in the form of a compression spring 70 is positioned around the shaft portion 52 of the drive member between the disk portion 54 and the collar 72. The spring 70 urges drive member 48 against the driven member 62, placing the associated teeth into a driving engagement resulting in a self-engaging coupling.

Figure 6:
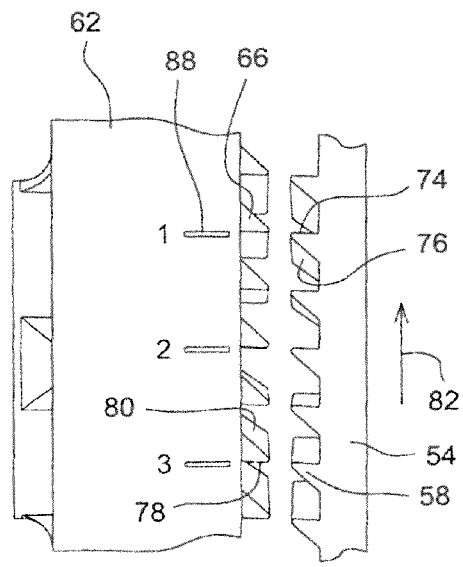
FIG. 6 is an enlarged view of the drive engaging teeth of the drive and driven members in a disengaged position.
Figure 7:
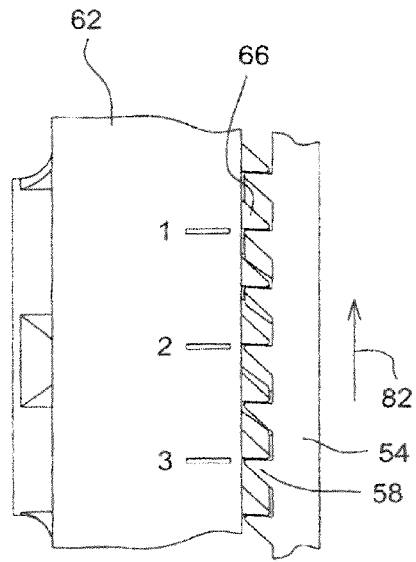
FIG. 7. is an enlarged view of the drive engaging teeth of the drive and driven members in an engaged position.

With reference to FIGS. 6 and 7, the teeth 58, 62 of the drive and driven members are shown in greater detail. The teeth 58 have substantially axial extending surfaces 74 on one side and inclined surfaces 76 on the opposite side. Likewise, the complementary teeth 66 of the driven member 62 have axially extending surfaces 78 and inclined surfaces 80 on the opposite side. When in driving engagement, the axially surfaces 74 and 78 engage one another as the drive member rotates in the direction of the arrow 82. The driven member is adjustable relative to the drive member by manually rotating the driven member in the direction of arrow 82. This causes the inclined surfaces of the teeth to engage, and as the driven member is continued to be rotated, forces the drive member to slide to the right as viewed in FIGS. 3 and 5, compressing the spring 70, and moving the drive and driven members to a relative position of disengagement of the teeth as shown in FIG. 6 with an exaggerated separation for purposes of clarity. Since the drive member is coupled to the main shaft 20, which only turns when the machine is in motion, the drive member will not rotate when the driven member is being manually turned. The result is an adjustment of the seed meter position relative to the machine drive, namely the shaft 20 and thus an adjustment relative to a seed meter in another row unit that is currently fixed to the shaft 20. The drive member 48 and the driven member 62 thus form a self-engaging and adjustable drive coupling that connects the seed meter 22 to the planter main drive 20 to supply rotary power to the seed meter. When manually released, the drive and driven members return to the drivingly engaged position. While the adjustable drive coupling is illustrated and described as having the drive member movable and the driven member stationary, either or both of the drive and driven members can be movable between the engaged and disengaged positions.

The drive member has radially opposite extending tabs 84. These tabs can be used to manually move the drive member to a disengaged position, allowing the driven member to be rotated in the direction opposite the arrow 82. The tabs 84 are formed with a raised rib 86 or other feature, serving as a reference mark. The outer periphery of the driven member 62 is formed with raised ribs or features 88 (FIG. 6) that are labeled. The ribs 86 and 88, or other features, thus form indicia to determine the relative rotational positions of the drive and driven members.

Figure 8:
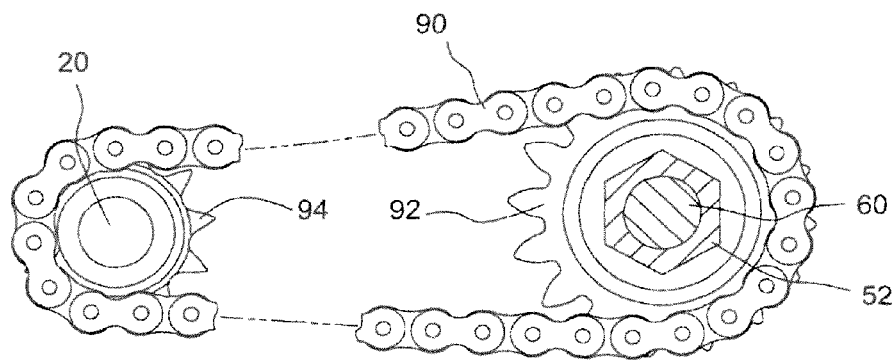
FIG. 8 is a side view of an alternative embodiment of the meter drive with a chain in place of the flexible drive shaft.

An alternative embodiment is shown in FIG. 8. Here the flexible drive shaft 30 has been replaced with a chain 90 extending from the main shaft 20 and sprocket 94 to the drive member 48. A sprocket 92 receives the chain and has a hex bore to receive the shaft portion 52 of the drive member. Supporting structure and bearings have been removed to more clearly illustrate the invention. All other components are generally the same as the previous embodiment and are given the same reference numerals. The drive member 48 is axially movable relative to the sprocket 92 in the same manner as described above.

Figure 9:
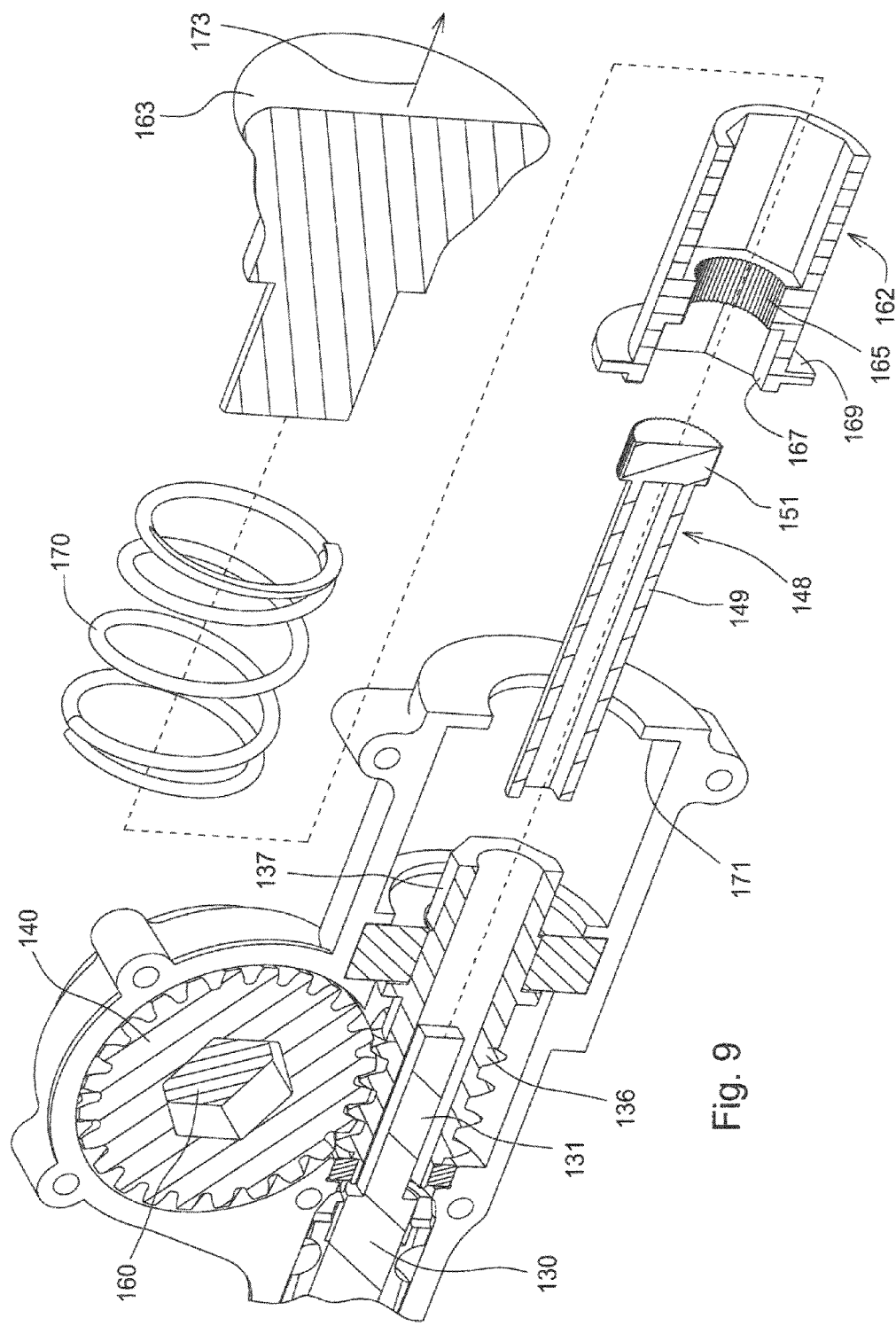
FIG. 9 is an exploded perspective sectional view of another alternative embodiment of the adjustable meter drive coupling.

Yet another embodiment is shown in FIG. 9. Here the coupling, consisting of the drive and driven members, is located between the end of the flexible shaft 130 and the output bevel gear 136. Similar components are given the same reference numerals with the addition of 100. The flexible shaft 130 has an end portion 131 that is square and which extends into a bore in the output bevel gear 136 but does not drivingly engage the bevel gear. Instead, the shaft and portion 131 fits into a drive member 148 having a hollow shaft portion 149 that is square in shape to drivingly receive the shaft and portion 131. The drive member terminates in an end portion 151 that is preferably splined but can have other non-round shapes. The driven member 162 fits over the drive member 148 and has an internal bore 165 that is complementarily shaped, i.e. splined, to drivingly engage the drive member end portion 151. The driven member 162 further has a hollow shaft portion 167 having a hex-shaped bore that receives a hex-shaped end portion 137 of the bevel gear 136 to drivingly connect the driven member to the bevel gear. The bevel gear 136 in turn meshes with the gear 140. Gear 140 has a central bore that is hex shaped and receives the meter shaft 160.

Knob 163 is coupled to, or integrally formed with, the driven member 162 to facilitate manual manipulation of the driven member. A biasing member, in the form of compression spring 170, surrounds the driven member 162 and acts against the collar 169 on the driven member 162 and the shoulder 171 formed in the transmission housing to bias the driven member to the left as shown in FIG. 9 such that the internal bore 165 is in driving engagement with the end portion 151 of the drive member. Adjustment of the seed meter is accomplished by manually grasping the knob 163 and pulling the knob to the right as shown by the arrow 173. This moves the driven number 162 off the end portion 151 of the drive member but maintains engagement of the driven member hex bore 167 with the hex surface 137 of the bevel gear 136. Once the knob has been pulled to disengage from the drive member, rotation of the knob will cause the level gear 136 to rotate along with the meshing gear 140 and the meter shaft 160. Upon release of the knob 163, the spring 170 returns the driven member 162 to driving engagement with the drive member 148.

Figure 10:
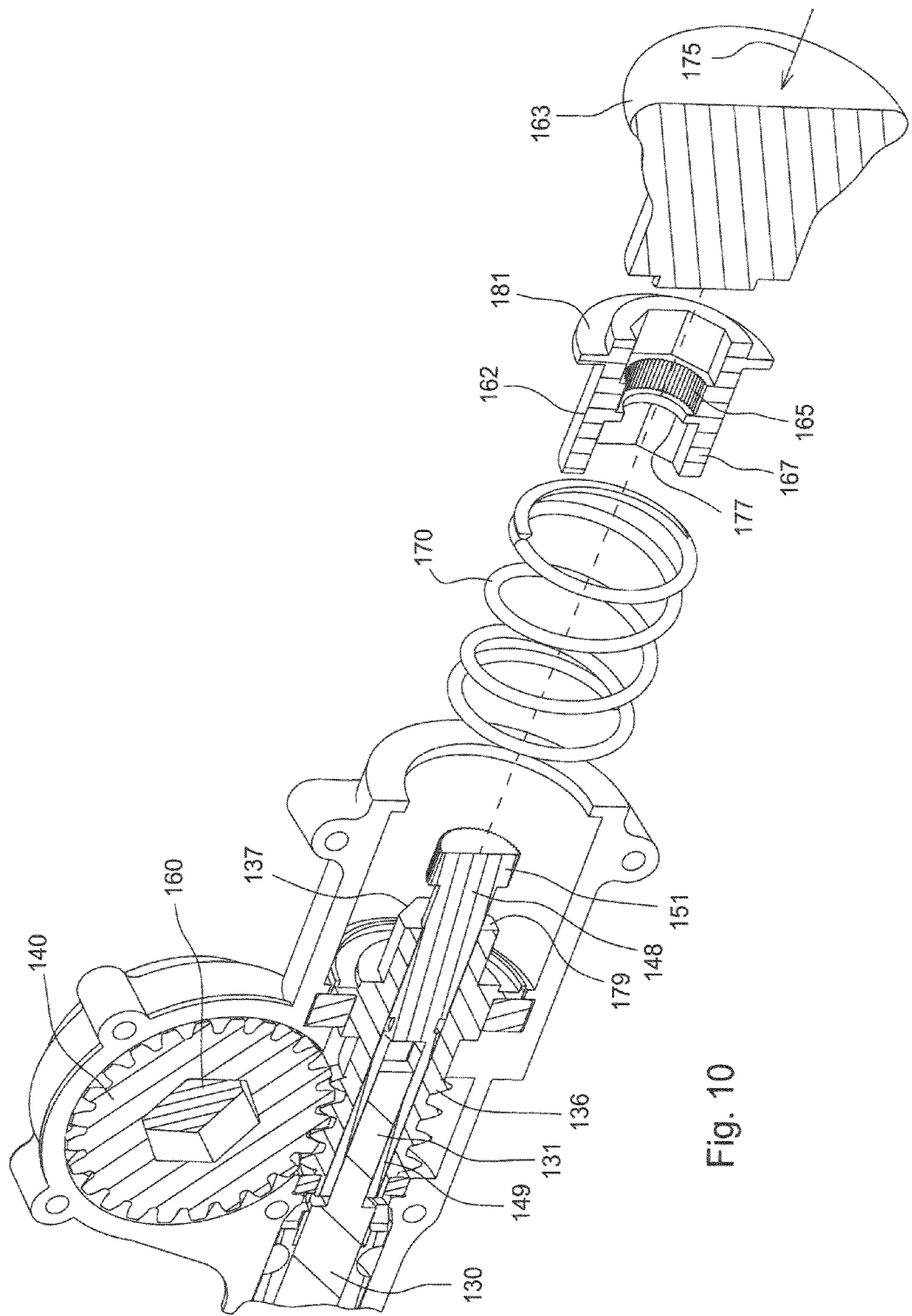
FIG. 10 is a exploded perspective sectional view of a still further alternative embodiment of the adjustable meter drive coupling.

FIG. 10 shows another embodiment, similar to FIG. 9, with the difference being that the knob 163 is pushed in the direction of the arrow 175 rather than pulled. The driven member 162 includes a shoulder 177 that rests against the end portion 151 of the drive member in the drivingly engaged position and will rest against the end 179 of the bevel gear 136 when the knob is pushed in. The biasing member 170 acts against a shoulder 181 on the driven member to hold the driven member in the position in which it is drivingly engaged with the drive member 148.

The seed meter adjustment mechanism of the present invention enables the seed meter position to be adjusted relative to the planter and the planter drive without the need for disassembly or removal of any components. The coupling is self-engaging when manually released. This differs from the mechanism U.S. Pat. No. 7,377,221 which requires partial disassembly and removal of components to make a meter adjustment. This also differs from the Great Plains twin-row planter. With Great Plains, following adjustment the chain must be placed back on the sprocket. The chain can not merely be released and then self-engage the sprocket. Further, adjustment is accomplished without the need to handle any lubricated components such as a chain, thereby avoiding soiling of the hands.

While the adjustable coupling is shown located at the meter, that is after the flexible drive shaft 30 or the chain 90, the adjustable coupling could be located between the shaft 20 and the forward end of the flexible drive shaft 30 or chain 90.

Having described the preferred embodiment, it will become apparent that various modifications can be made without departing from the scope of the invention as defined in the accompanying claims.

The invention claimed is:

1. An agricultural seeding machine, comprising:
a drive providing power;
a seed meter including a meter shaft; and
a drive coupling between the drive and the meter shaft, the coupling including a drive member operably connected to the drive and a driven member operably coupled to the meter shaft, the drive member and the driven member being self-engaging with one another in a driving relationship to transmit driving power from the drive to the meter shaft, the drive member and driven member being selectively movable relative to one another to a disengaged position enabling adjustment of the seed meter relative to the drive wherein the drive coupling includes a knob that is manually pushed to move the driven member to a disengaged position relative to the drive member.

2. An agricultural seeding machine, comprising:
a drive providing power;
a seed meter including a meter shaft; and
a drive coupling between the drive and the meter shaft, the coupling including a drive member operably connected to the drive and a driven member operably coupled to the meter shaft, the drive member and the driven member being self-engaging with one another in a driving relationship to transmit driving power from the drive to the meter shaft, the drive member and driven member being selectively movable relative to one another to a disengaged position enabling adjustment of the seed meter relative to the drive wherein the drive coupling includes a knob that is manually pulled to move the driven member to a disengaged position relative to the drive member.

3. An agricultural seeding machine, comprising:
a drive providing power;
a seed meter including a meter shaft; and
a drive coupling between the drive and the meter shaft, the coupling including a drive member operably connected to the drive and driven member operably coupled to the meter shaft, the drive member and the driven member being self-engaging with one another in a driving relationship to transmit driving power from the drive to the meter shaft, the drive member and driven member being selectively movable relative to one another to a disengaged position enabling adjustment of the seed meter relative to the drive wherein the drive member is movable in a direction substantially axially relative to the meter shaft and wherein the drive coupling includes a push/pull knob that is manually actuated to move the driven member to the disengaged position relative to the drive member.

4. An agricultural seeding machine, comprising:
a meter shaft;
a metering mechanism coupled to the meter shaft at one end of the shaft;
a drive input member extending in a direction generally normal to the meter shaft;
a drive member extending from the drive input member in a direction away from the metering mechanism to a distal end of the drive member;
a drive coupling at the distal end of the drive member, said drive coupling including a driven member operably coupled to the meter shaft, the drive member and the driven member being self-engaging with one another in a driving relationship to transmit driving power from the drive input member to the meter shaft, the drive member and driven member being selectively movable relative to one another to a disengaged position enabling adjustment of the seed meter relative to the drive input member and wherein the drive coupling includes a push/pull knob that is manually actuated to move the driven member to the disengaged position relative to the drive member.

5. The agricultural seeding machine according to claim 4 wherein the drive input member is a flexible drive cable.

6. The agricultural seeding machine according to claim 4 wherein the drive input member is a chain.

7. The agricultural seeding machine according to claim 4 further comprising a biasing member urging the drive member into engagement with the driven member.

8. The agricultural seeding machine of claim 4 wherein the drive member and the driven member have complementary mating teeth to drivingly engage one another for rotational drive in a first direction.

* * * * *